Feb. 10, 1953 W. E. MAY 2,627,782
DECORATIVE ATTACHMENT FOR SPECTACLES
Filed July 5, 1949

INVENTOR.
Wallace E. May
BY Townsend and Townsend
ATTORNEYS

Patented Feb. 10, 1953

2,627,782

UNITED STATES PATENT OFFICE 2,627,782

DECORATIVE ATTACHMENT FOR SPECTACLES

Wallace E. May, Eureka, Calif.

Application July 5, 1949, Serial No. 103,057

2 Claims. (Cl. 88—41)

This invention relates to an improved decorative attachment for spectacles.

There has in recent years been a steadily increasing tendency to ornament and decorate eye glasses and spectacles by applying to the rims or frames of the spectacles decorative designs. One popular method of ornamenting spectacles is to apply, by metal spraying or the like, metal (particularly gold or silver) inlay to the plastic lens frames and temple pieces of rim or frame-type spectacles. Another conventional way of decorating spectacles is to apply clip-on bands around the rims of the spectacles which support the lenses thereof. Reference is also hereby made to my copending application filed concurrently herewith entitled "Decorative Attachment for Rimless Spectacles," Ser. No. 103,058, filed July 5, 1949, and now abandoned.

There is illustrated in the accompanying drawings three different embodiments of the present invention. Broadly speaking, each embodiment illustrated in the drawings encompasses the employment of a pair of ornamental or decorative bands which are adapted to normally respectively overlie front peripheral or marginal portions of a pair of eye-glass lenses. Moreover, each embodiment of my invention illustrates the principle of attaching pivotally each of the bands to a part of the spectacles to permit each of the bands to be moved in a direction toward and away from the lens which the band is adapted to normally overlie.

In Fig. 1 there is illustrated a pair of spectacles to which are attached a pair of ornamental or decorative bands, and each band, in turn, is hinged pivotally to a temple attaching screw of the spectacles for movement toward and away from an associated spectacle lens.

Figure 1:
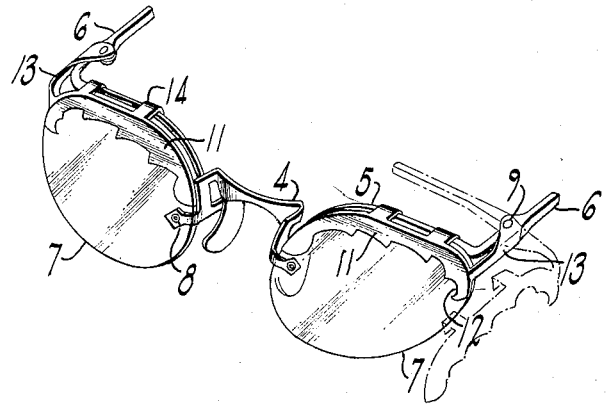

A principal object, therefore, of the present invention is to provide in combination with a pair of spectacles a pair of decorative or ornamental bands, each of which is mounted pivotally for movement toward and away from an associated lens which the band is adapted to normally overlie.

Another object of the present invention is to provide decorative bands for spectacles which said band can be made out of various materials and in different colors to suit the tastes and fancies of users thereof.

Other objects of the present invention will become apparent upon reading the following specification and referring to the accompanying drawings in which similar characters of reference represent corresponding parts in each of the several views.

In the drawings:

Fig. 1 is an isometric view of a pair of spectacles in association with one embodiment of my invention.

Figure 2:
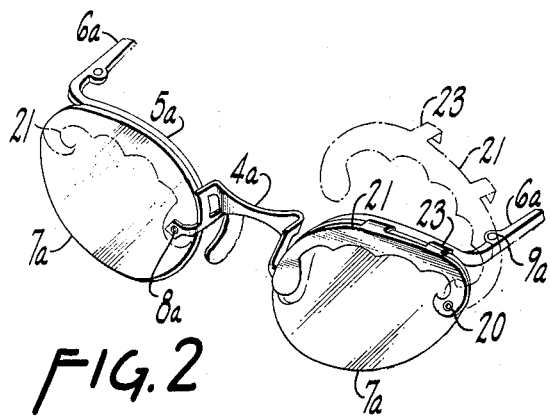
Fig. 2 illustrates how a decorative band may be hinged pivotally to an end piece screw of a pair of rimless-type spectacles.

Fig. 2 is an isometric view of another type of spectacles in association with a second embodiment of my invention.

Figure 3:
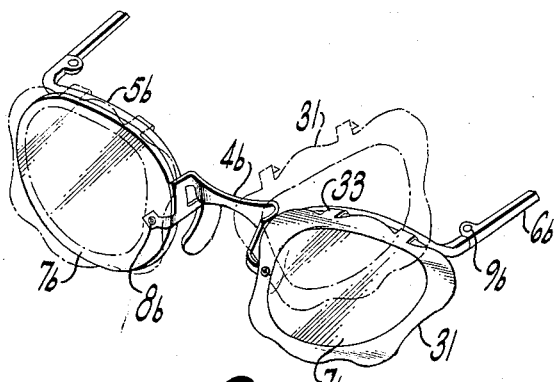
Fig. 3 illustrates how each decorative band may be attached pivotally with respect to a lens by a center-piece screw, and Fig. 3 also illustrates how each decorative band may be made substantially annular to overlie the entire peripheral front portion of an associated lens.

Fig. 3 is an isometric view of a pair of spectacles in association with a third embodiment of my invention.

Referring now particularly to Fig. 1 there is illustrated a pair of rimless spectacles of a type commercially available today. This type of spectacles comprise, generally, a bridge piece 4, lens supporting means comprising wire frame pieces 5, a pair of temples 6 (shown fragmentarily) and a pair of lenses 7. In this type of eye-glass construction the bridge piece 4 is secured at its opposite ends by welding or the like (not shown) to the wire frame pieces 5. The lenses 7 are rigidly affixed to the wire frame pieces 5 by a pair of center-piece screws, indicated at 8. Each temple piece 6 is pivotally secured to a wire frame piece 5 by a temple attaching screw 9.

The pair of decorative bands, indicated generally at 11, may be of metal or may be made out of a suitable plastic compound, such as cellulose acetate or the like.

The top boarder or edge of each band 11 may be formed similar in contour to the outline or boarder of the top of the lens to which the band is attached. The lower edge of each band may be cut as at 12 in an irregular fashion to form an attractive design or pattern, and the bands, of course, may be further decorated and ornamented in any way desired. The outer end of each band is provided with a rearwardly projecting extension portion 13 which may be formed as an integral part thereof, and each extension portion 13 is provided with a suitable aperture (not shown) to receive therethrough a temple attaching screw 9. Each band may be applied to the spectacles by removing the temple attaching screw and reapplying the screw to the spectacle frame with the shank portion of the screw projecting through the opening provided for that purpose in the extension portion 13 of the band.

The band illustrated in broken lines in Fig. 1 illustrates how it may be swung outwardly away from the front of the lens. The advantage obtained by mounting the band to swing outwardly away from its associated lens is that the lens may be easily and thoroughly cleaned at frequent intervals throughout its entire lens area, and it is, therefore, always possible for a user to remove dirt or other foreign substances from the lenses which might otherwise lodge between the lenses and the decorative bands.

Each of the bands 11 is, preferably, provided with a plurality of rearwardly extending hook-shaped portions indicated at 13. These hook-shaped portions are adapted to hook over the lens frame or wire mounting to hold the band pressed flatly throughout its length against the lens face when the band has been moved to its normal overlying position with respect thereto.

Although I have illustrated the decorative bands 11 as being attached to rimless spectacles, it is believed evident that these bands could be applied equally as well to conventional plastic or horn-rimmed spectacles having temples attached to the spectacle frames by temple attaching screws or bolts.

In Fig. 2 there is illustrated another type of rimless spectacles which are very similar in construction to the type illustrated in Fig. 1 and hereinabove described except that in the spectacle construction in Fig. 2 each lens is secured adjacent its ends to the wire mounting of the spectacles by a center-piece screw indicated at 8a and an end piece screw indicated at 20. In other respects the spectacle construction shown in Fig. 2 is generally similar to the construction illustrated in Fig. 1, and more specifically comprises a bridge piece 4a, wire frame pieces 5a, temple pieces 6a, lenses 7a, center-piece screws 8a and temple attaching screws 9a. The decorative bands 21 which are illustrated in Fig. 2 are similar in construction to bands 11 shown in Fig. 1 and hereinabove described in considerable detail. However, each band 21 is shown as being attached pivotally to an associated lens 7a by an end piece screw 20. Thus, it is seen that whereas bands 11 illustrated in Fig. 1 are adapted to pivot about a vertical axis (the temple attaching screws) which permits these bands to move outwardly and to the front of the lens, the bands 21 illustrated in Fig. 2 pivot respectively about horizontal axes (the end piece screws 20), and, therefore, are adapted to move up or down with respect to the faces of the lenses and in a plane substantially parallel therewith. Nevertheless, it is evident that bands 21 may be moved conveniently out of normal overlying contact with the faces of the lenses to permit thorough cleaning of the latter.

Each band 21 is, preferably, provided with a plurality of rearwardly extending integral hook-shaped portions 23 which are adapted to enter into hook engagement with the wire mounting (comprising elements 5a) which support the spectacle lenses.

In Fig. 3 there is illustrated a pair of spectacles which incorporate the same basic features of construction which are embodied in the spectacles shown in Fig. 1 and hereinabove described. The elements of the spectacle construction shown in Fig. 3 are numbered the same as the corresponding elements heretofore identified with respect to the spectacle construction of Fig. 1 except that the identifying numerals appearing in Fig. 3 are suffixed by the letter "b" to distinguish them in the drawings.

The ornate or decorative bands 31 illustrated in Fig. 3 differ from the bands illustrated in Figs. 1 and 2 in that bands 31 are substantially annular, and each band 31 is adapted to normally overlie the front marginal portions of the lenses throughout their entire respective peripheries. Each band 31 is provided with a suitable aperture through which a center-piece screw 8b may extend, and attachment of a band 31 to an associated lens by a center-piece screw in the above manner provides a pivotal support for the said band to permit the latter to be swung pivotally upwardly out of contact with its associated lens during lens cleaning or polishing operations. Each band 31 is provided along its top edge with hook-shaped portions 33 which, of course, are adapted to enter into hook engagement with the wire mounting (comprising elements 5b) of the spectacles when the band has been moved into its normal overlying position with respect to an associated lens 7b.

Although I have illustrated the decorative bands 31 shown in Fig. 3 as the only ones being substantially annular, it is understood that annular bands may be attached pivotally in the ways illustrated both in Figs. 1 and 2 and similarly, bands of the same general contour as those indicated at 11 and 21 in Figs. 1 and 2, respectively, may be substituted for the substantially annular shaped bands 31 shown in Fig. 3. In short, any of the decorative bands illustrated and described herein may be made, if desired, substantially annular or may be made in the nature of a curved flat strip to overlie only the top marginal portions of lenses, such as specifically illustrated in Figs. 1 and 2.

Although I have frequently used the terms "screw" or "screws" to identify the center-piece, end piece and temple screws of the spectacles, it is understood that small nuts and bolts may be used as equivalent attaching means, and my invention is, therefore, not limited to the specific means of attaching the various types of decorative bands illustrated and described herein by screws as literally defined.

Although I have described my invention in some detail by way of illustration and example for purposes of clarity of understanding, it is understood that certain changes and modifications may be practiced by those skilled in the art without departing from the spirit of the invention and scope of the appended claims.

I claim:

1. In combination with rimless spectacles having lenses, a wire mounting, temples attached pivotally to opposite ends of said wire mounting, a center piece screw and an end piece screw for securing each lens to the wire mounting, each lens and the wire mounting being apertured to receive the center piece screw and the end piece screw for securing said lens to the wire mounting; a pair of decorative bands, each said band adapted to normally overlie a front marginal portion of a lens, each said band being apertured at one end for pivotal attachment by one lens securing screw to the lens which said band is adapted to normally overlie, a hook-shaped member formed integral with each said band and remote from the pivotal attachment, to hook over the lens and the wire mounting to hold said band flatly pressed throughout its length against the lens which said band is adapted to overlie when the band occupies its normal overlying position with respect to the lens.

2. In combination with rimless spectacles having lenses, a wire mounting, temples attached pivotally to opposite ends of said wire mounting, and at least one lens securing screw for each lens, each lens and the wire mounting being apertured to receive the corresponding lens securing screw for securing said lens to the wire mounting; a pair of decorative bands, each said band adapted to normally overlie a front marginal portion of a lens, each said band being apertured at one end for pivotal attachment by one lens securing screw to the lens which said band is adapted to normally overlie, a hook-shaped member formed integral with each said band and remote from the pivotal attachment, to hook over the lens and the wire mounting to hold said band flatly pressed throughout its length against the lens which said band is adapted to overlie when the band occupies its normal overlying position with respect to the lens.

WALLACE E. MAY.

REFERENCES CITED

The following references are of record in the file of this patent:

UNITED STATES PATENTS

| Number | Name | Date |
|---|---|---|
| 1,505,882 | Geiger | Aug. 19, 1924 |
| 1,744,993 | Tamplin | Jan. 28, 1930 |
| 1,804,922 | Feltman et al. | May 12, 1931 |
| 2,197,682 | Brown | Apr. 16, 1940 |
| 2,208,356 | Bosworth | July 16, 1940 |
| 2,344,230 | Brown | Mar. 14, 1944 |
| 2,362,002 | Gluck | Nov. 7, 1944 |
| 2,479,754 | Marks | Aug. 23, 1949 |
| 2,482,195 | Martin | Sept. 20, 1949 |
| 2,495,508 | Cleaver | Jan. 24, 1950 |
| 2,566,236 | Meddoff | Aug. 28, 1951 |

FOREIGN PATENTS

| Number | Country | Date |
|---|---|---|
| 466,034 | Great Britain | May 20, 1937 |